United States Patent [19]
Struthers et al.

[11] Patent Number: 5,984,377
[45] Date of Patent: Nov. 16, 1999

[54] BONDABLE PLASTIC PIPING ADAPTER JOINT

[75] Inventors: Kevin D. Struthers, Coatesville;
Michael C. Webb, Chester Springs, both of Pa.

[73] Assignee: Interon Corporation, Exton, Pa.

[21] Appl. No.: 09/150,567

[22] Filed: Sep. 10, 1998

Related U.S. Application Data

[60] Provisional application No. 60/058,680, Sep. 12, 1997.

[51] Int. Cl.⁶ .................................................... F16L 33/00
[52] U.S. Cl. ..................................... 285/258; 285/148.12
[58] Field of Search .................................. 285/258, 259, 285/148.9, 148.12, 148.13, 148.16, 915, 21.3, FOR 156

[56] References Cited

U.S. PATENT DOCUMENTS

| | | |
|---|---|---|
| 3,858,914 | 1/1975 | Karie et al. ..................... 285/148.13 X |
| 4,893,848 | 1/1990 | Melcher ................................... 285/258 |
| 5,209,527 | 5/1993 | Hohmann et al. .................. 285/258 X |

FOREIGN PATENT DOCUMENTS

WO 96/09487   9/1998   WIPO .

*Primary Examiner*—Lynne H. Browne
*Assistant Examiner*—Greg Binda
*Attorney, Agent, or Firm*—Seidel, Gonda, Lavorgna & Monaco, PC

[57] ABSTRACT

A plastic pipe joint between two dissimilar plastics, one being a non-glueable olefin or rubber and the other a glueable or solvent-weldable plastic. The joint consists of a glueable, plastic ferrule compression fitted over the end of an olefinic or other non-glueable pipe by means of an internally expanded metal insert inside the olefinic pipe. A method for employing the instrumentalities of the invention in a pipe joint is also described.

16 Claims, 4 Drawing Sheets

BONDABLE PLASTIC PIPING ADAPTER JOINT

This invention claims priority from the provisional application serial No. 60/058,680, filed Sep. 12, 1997.

FIELD OF THE INVENTION

This invention relates to a joining assembly and method for plastic piping where dissimilar plastics with different characteristics and benefits are able to be joined together to create a more versatile plastic piping system.

BACKGROUND OF THE INVENTION

Plastic piping, especially in smaller diameter sizes, is rapidly becoming the material of preference in many piping applications. It is lightweight, less expensive and more corrosion resistant than most conventional metal systems.

The idea of joining dissimilar plastic pipes together is not new. Mechanical couplings have been used since plastic pipe was first developed. Most mechanical coupling devices are typically metal sleeves, bolted around the outside of the pipe, where they are exposed to the environmental conditions that can corrode them over time.

Different piping materials obviously have different properties, and different plastics also have distinct properties. Polyolefins, like polyethylene (PE) and polypropylene (PP), can be coiled in long lengths, minimizing the number of joints. The normal procedure for jointing olefin piping is heat fusion, as this type of plastic cannot be glued or solvent-welded. In heat-fusion joining, both elements being joined are heated to melting temperature and fused as they cool in contact with one another. The heat fusion procedure can be affected by many variables, such as ambient temperature, the presence of moisture, operator error in handling the temperature settings and joining pressures.

Other types of plastic pipe are commonly glued or welded together using solvents. Common glueable or solvent-welded pipe like polyvinyl chloride (PVC), is rigid and is shipped in straight lengths, typically twenty feet long. Glued or solvent-welded joints are labor intensive and still frequently suffer from assembler error because of faulty welds or improper installation technique.

SUMMARY OF THE INVENTION

The present invention is a combination mechanical compression joint that is easily installed in the field and a solvent-weld joint to connect a non-glueable plastic pipe to a glueable plastic pipe or fitting. With this jointing system, long runs between fittings such as tees, valves and cleanouts, can be done with joint-free olefin piping such as polyethylene. The fittings can be of solvent-weldable plastic such as PVC. The present invention is a joint assembly and method that enables reliable connection between non-glueable plastic pipe and glueable (or solvent-weldable) plastic fittings.

The joint comprises a metal insert, with barb-shaped ribs on the outer diameter and a protruding shoulder at the base. The insert fits into the end of the olefin pipe. The joint also comprises a plastic ferrule, with barb shaped ribs on its inner diameter, made of the same glueable plastic as the fitting being connected to, which is fitted onto the outside of the olefin pipe. The metal insert is internally expanded (swaged) with a hydraulic cylinder. An oversized metal plug or swage is pulled through the metal insert, expanding the metal outwards, thus causing the ribs on the outer diameter of the metal insert to pinch the plastic pipe tight up against the ribs on the inner diameter of the plastic ferrule. The shoulder at the bottom of the metal insert is designed to penetrate the plastic ferrule directly, making a direct mechanical seal. The plastic ferrule is then glued or solvent-welded to the appropriate fitting. The next length of olefin piping is swaged with another ferrule, which is solvent-welded to the fitting and the pipe is laid to the next fitting.

For the following description and claims, the term "glueable" shall be used to denote both glueable and solvent-weldable materials.

BRIEF DESCRIPTION OF THE DRAWINGS

For the purpose of illustrating the invention, and wherein like numerals identify like elements, there are shown in the drawings forms which are presently preferred; it being understood however, that this invention is not limited to the precise arrangements and instrumentalities shown.

DESCRIPTION OF THE INVENTION

Figure 1:
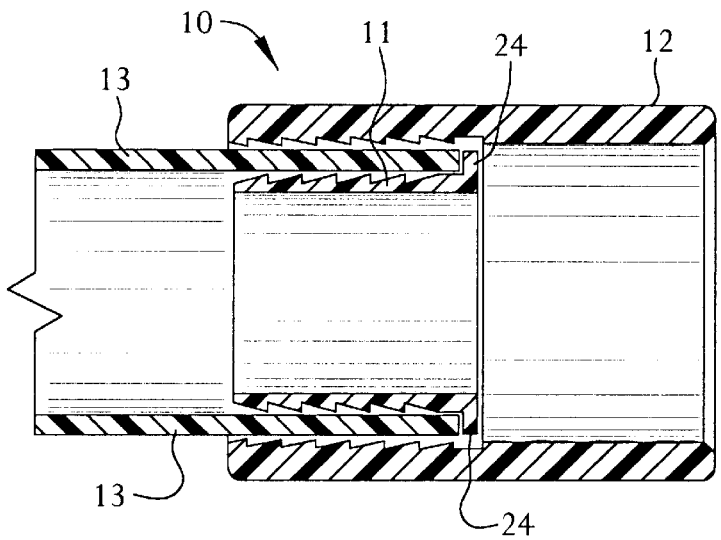
FIG. 1 is a cross section of the joint showing the three components of the joint.

With reference to FIG. 1, which shows a presently preferred embodiment of the invention, the pipe joint 10 comprises a metal insert 11 that is fitted into a non-glueable plastic pipe 13. At one end of the metal insert 11 is a raised shoulder 24 on the insert that abuts the end surface of the plastic pipe 13 when the insert 11 is disposed within the pipe.

The insert 11 of the preferred embodiment has barbed ribs 14 on its exterior surface for gripping the interior surface of the plastic pipe 13. The barbed ribs 14 are circumferential on the preferred embodiment of the insert 11, but may take other forms and obtain the same result as the preferred form. For instance, the gripping elements may be a plurality of individual barbs or raised protrusions that intrude into the interior surface of the pipe when compressed against it.

A glueable ferrule 12 is fitted around the external surface of the end of the pipe. The ferrule 12 is coextensive on the outside of the pipe 13 for the length of the insert 11 disposed within the pipe 13. This positions the three elements of the mechanical compression joint in the proper relation to each other before compression from within. FIG. 1 shows the three components of the compression joint before they are swaged together. The ferrule 12 also has barbed ribs 15, though these are on the inside surface of the ferrule for engagement with the exterior surface of the pipe 13. As on the insert, the ribs 15 are circumferential on the preferred embodiment of the ferrule 12, but may take other forms and accomplish the same result as the illustrated form.

Figure 2:
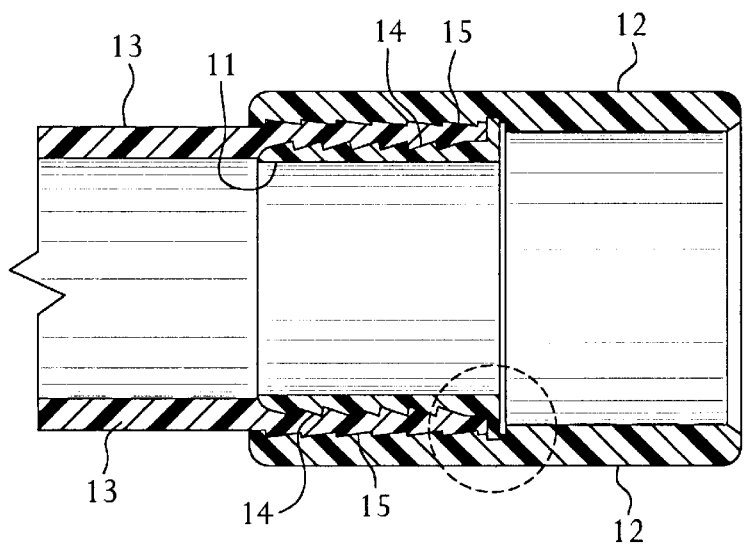
FIG. 2 is a cross section of the joint in FIG. 1, showing the components after swaging.

FIG. 2 is an illustration of the mechanical compression joint, and the relation of the three components, after swaging compresses the components together. In FIG. 2, the metal insert 11 has been expanded outward. The barbed ribs 14 on the insert 11 have penetrated into and engaged the interior surface of the plastic pipe 13. The outward pressure of the expanded insert 11 has also compressed the pipe 13 between the barbed ribs 14 of the insert 11 10 and the barbed ribs 15 on the inner diameter of the ferrule 12, engaging the outer surface of the pipe 13.

Figure 3:
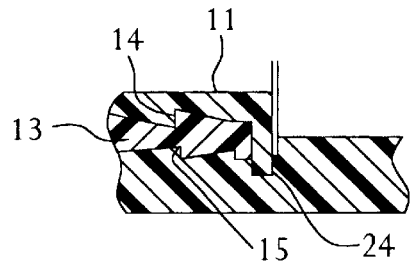
FIG. 3 is a detail of FIG. 2 showing the shoulder of the metal insert locking into the plastic ferrule directly.

FIG. 3 shows a detail of FIG. 2 where the shoulder 24 of the metal insert 11 is imbedded directly into the wall of the ferrule 12. FIG. 3 also shows the barbed ribs 14 of the metal insert 11 and the barbed ribs 15 of the plastic ferrule 12 engaging the respective inner and outer surfaces of the plastic pipe 13.

Figure 4:
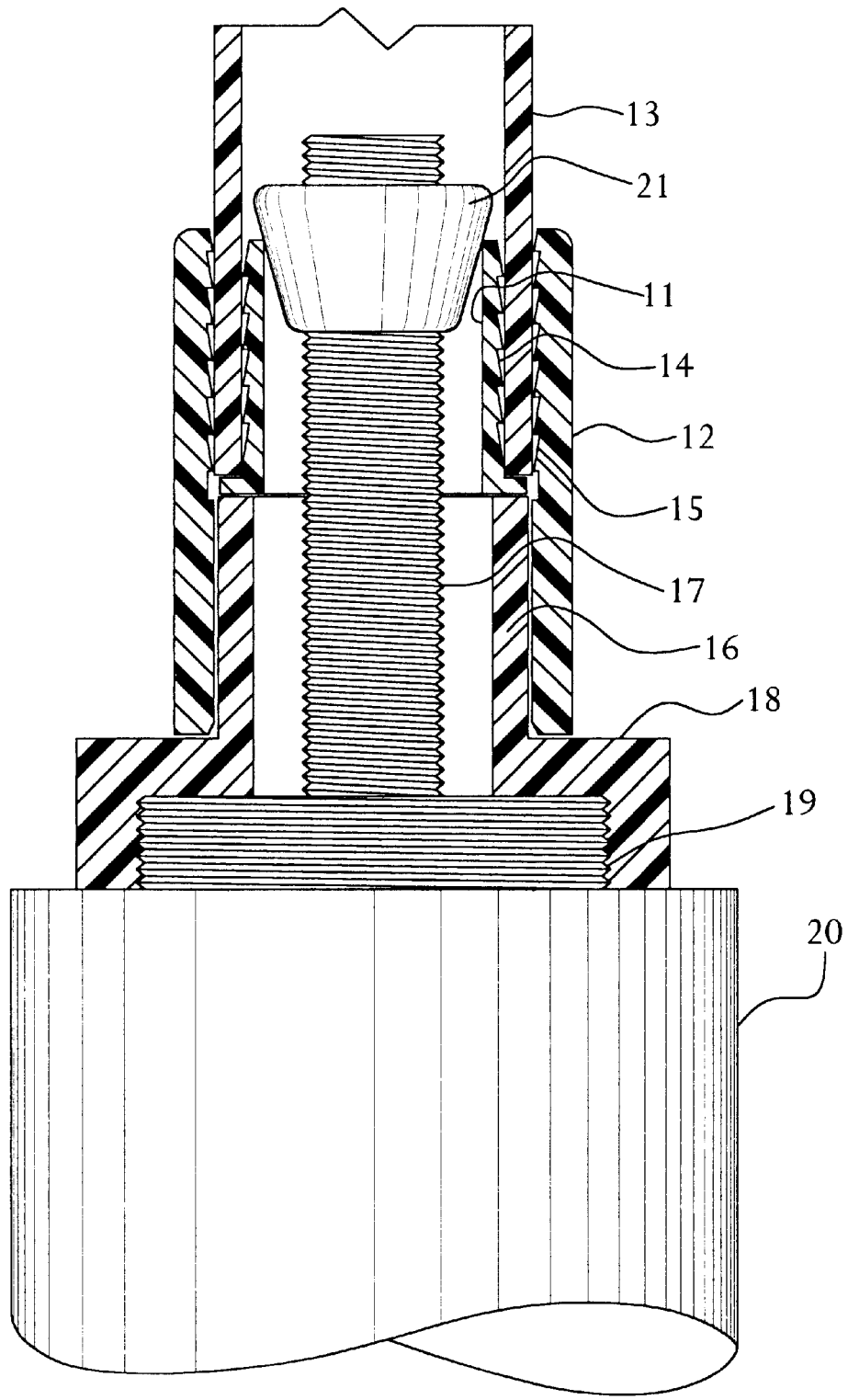
FIG. 4 is a cross section of the joint components ready to be swaged together with a hydraulic cylinder.

FIG. 4 shows the components of the pipe joint ready to be hydraulically swaged together. The insert 11 is fitted over the threaded piston 17 of the hydraulic cylinder 20 and set onto the face plate 18. The face plate 18 is screwed onto the cylinder 20 at the threaded connector 19. The swage head 21 is screwed onto threaded piston 17 until it is tight against the insert 11. The glueable plastic ferrule 12 is fitted over the raised center section 16 of the face plate 18 and set onto the base of the face plate 18. The non-glueable plastic pipe 13 is then pushed down between the insert 11 and the ferrule 12 until it butts against the shoulder 24 on the insert 11. The hydraulic cylinder 20 is turned on so that the swage head 21 is pulled through the metal insert 11. The expanding force applied by the swage head 21 flares the metal insert 11 outward, imbedding the barbed ribs 14 into the plastic pipe 13, which in turn is compression fitted into the barbed ribs 15 of the ferrule 12.

Referring back to FIG. 2, the joint of the invention can be seen to provide a transition between a non-glueable pipe 13 and a glueable fitting or pipe end (not shown). The non-glueable plastic pipe 13 enters the joint of the invention and, using the metal insert 11, is joined with a glueable ferrule 12. The formerly non-glueable pipe end now has a glueable surface to join to the next element in a pipe system that requires a glueable surface, be it a coupling, a fitting or a termination in a piece of equipment.

Figure 5:
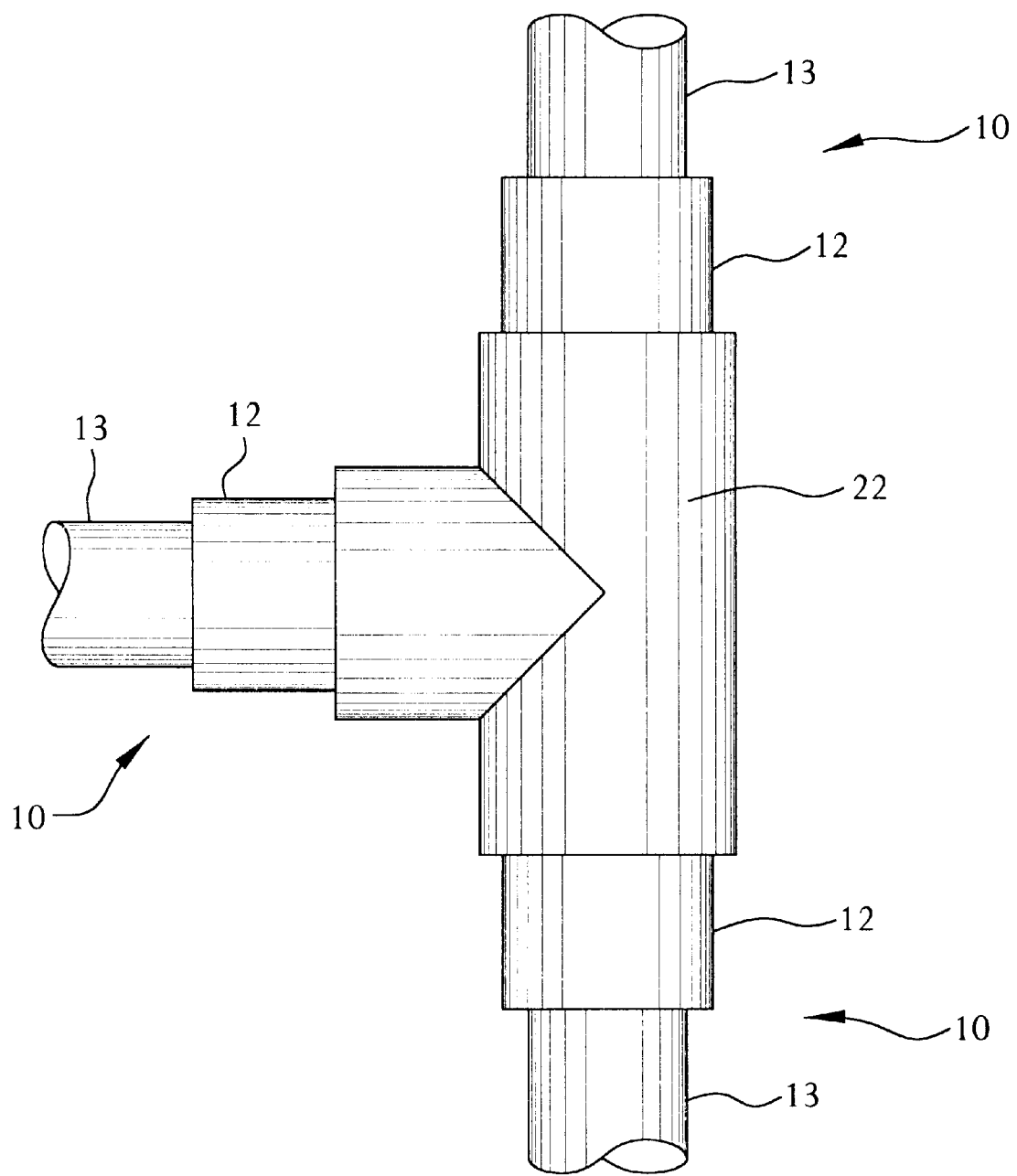
FIG. 5 is a side elevation view of a tee joint showing how the joint of the invention is used in a piping system.

FIG. 5 shows an application of the joint of the invention where the joint 10, fitted to a non-glueable pipe 13, is glued into a standard glueable tee fitting 22. Where once only a non-glueable pipe end 13 was presented, the invention provides a combination of the non-glueable pipe 13 with a glueable ferrule 12 so that a connection can be made with a tee-fitting 22 that requires a glueable surface for the connection.

Figure 6:
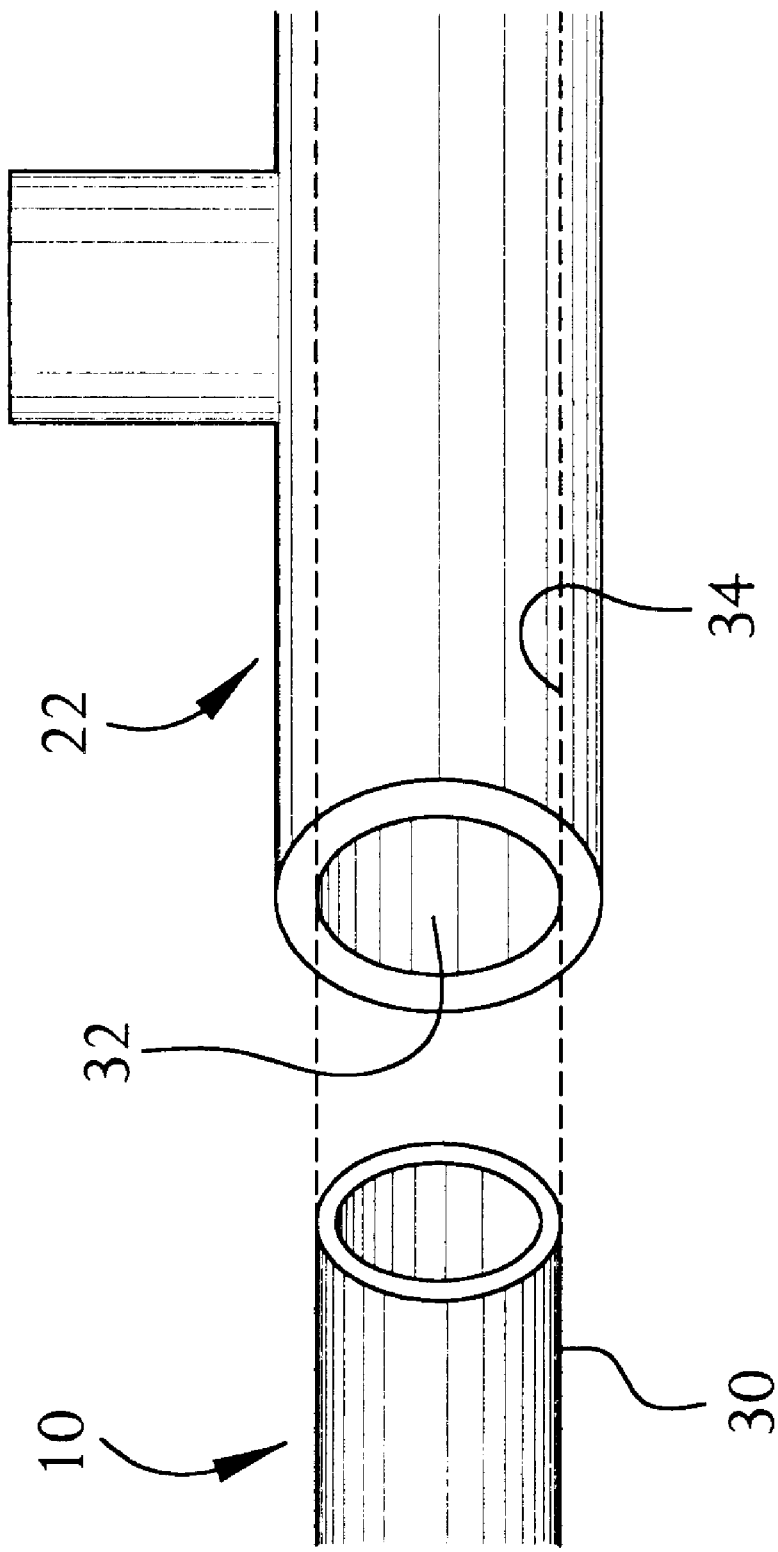
FIG. 6 is a perspective view of the pipe joint invention joining to a fitting.

FIG. 6 shows the detailed view of such a connection. The pipe joint 10 presents a glueable surface 30 to the fitting 22. The outside surface 30 of the pipe joint 10 slips into the opening 32 in the end of the fitting 22 (opening shown in shadow lines in FIG. 6) and comes in contact with the interior surface 34 of the fitting 22. Glue or solvent, the means for bonding the two surfaces, is applied to one or both surfaces as necessary before the pipe joint 10 is slipped into the fitting 22. The connection between the pipe joint 10 and the fitting 22 should be fixed in a stable position until the bonding agent sets permanently, providing a reliable connection between the two objects. In the illustrated embodiment, the fitting opening 32 has a larger diameter than the pipe joint ferrule, which fits inside the opening 32. It is also possible for the fitting to be sized to fit inside the opening in the pipe joint ferrule. Thus, either the inner or outer surface of the ferrule may be employed to connect to a fitting.

The pipe joint 10 may provide a connection to a glueable pipe segment (not shown) instead of a fitting. The inner diameter of the pipe segment opening may be either that of the outer diameter of the pipe joint ferrule or its inner diameter dimension. In the former case, the glueable pipe segment would fit over the end of the pipe joint ferrule; in the latter case, the pipe segment would be glued into the opening in the pipe joint ferrule.

A method of joining two dissimilar plastic pipes, or a plastic pipe to a dissimilar plastic pipe fitting, may be described employing the instrumentalities of the present invention, the non-glueable plastic pipe, the metal insert, and a glueable plastic ferrule. First, the metal insert is pushed into the terminal end of the pipe until the shoulder on the insert stops the travel of the insert into the pipe. Then, working on the swaging tool as described in the description of FIG. 4, the ferrule is slipped over the end of the pipe until the pipe penetrates the same depth into the ferrule as the insert penetrates into the pipe. Next, the metal insert is expanded by drawing the swage head through the insert. During this operation, the barbs on the insert are pushed outward to engage the inner surface of the pipe. Simultaneously, the outer surface of the pipe is compressed against the barbs on the ferrule. The pipe becomes fixedly engaged between the ferrule and the insert. The shoulder on the ferrule penetrates the inner surface of the ferrule, locking the insert in place.

After the pipe joint is assembled, the joint may be connected to a glueable fitting or to a glueable plastic pipe. For the remainder of this description, reference will be made to the fitting with the understanding that the pipe joint can just as effectively connect to a pipe segment too. In both cases, the fitting can be connected over the ferrule or inside it at the end opposite the insert in the ferrule. Where the fitting 22 is slipped over the joint 10 (see FIG. 6), a bonding means (such as glue or solvent) is applied to the external surface of the ferrule and/or the internal surface of the fitting. The fitting is slipped over the exterior of the open end of the ferrule and the connection fixed in a stable position until the bonding agent permanently sets. Where the end of the fitting fits inside the ferrule, the bonding agent may be most easily applied to the external surface on the fitting 22 before it is inserted into the joint 10.

The present invention may be embodied in other specific forms without departing from the spirit or essential attributes thereof and, accordingly, reference should be made to the appended claims, rather than to the foregoing specification, as indicating the scope of the invention.

What is claimed is:

1. A plastic pipe joint assembly for joining a terminal end of a non-glueable plastic pipe to glueable or solvent-weldable pipes, couplings and fittings comprising:

a metal insert and a plastic ferrule, said metal insert having a cylindrical shape for insertion into said plastic pipe, a shoulder for disposition against the terminal end of the pipe, and means for fixedly engaging the pipe on the surface of the metal insert for engaging the pipe on the pipe's interior;

said ferrule having a cylindrical shape for fitting around the pipe, and further having an inner diameter sufficiently larger than the pipe's outer diameter to permit the terminal end of the pipe to be inserted into the ferrule, said terminal end of the pipe having the insert inside the end of the pipe when said pipe end is placed inside the ferrule, said ferrule also comprising means for fixedly engaging the pipe on a portion of the ferrule's inner surface for engaging the pipe on the pipe's exterior, said engaging means extending along that portion of the inner surface of the ferrule that is coextensive with the length of the insert within the pipe, wherein a surface of the ferrule that does not engage the pipe provides a surface for glueing a glueable fitting, coupling, or pipe to the pipe joint;

said insert, after expansion within the pipe, being fixedly engaged in the pipe by the insert's engaging means penetrating the pipe on the pipe's interior, said ferrule, after the expansion of the insert in the pipe, being fixedly engaged on the pipe by the ferrule's engaging means penetrating the pipe on the pipe's exterior, said pipe being fixed in place between the expanded insert and the ferrule by compression of the pipe between the outer surface of the insert against the inner surface of the ferrule.

2. The pipe joint of claim 1, wherein, after expansion of the insert in the pipe, the shoulder on the insert is imbedded into the inner surface of the ferrule for fixing the position of the insert in the ferrule and providing a seal against leakage from the pipe joint.

3. The plastic pipe joint of claim 1; wherein a portion of the interior surface of the ferrule that does not engage the pipe provides the surface for glueing a glueable fitting, coupling, or pipe to the pipe joint.

4. The plastic pipe joint of claim 1, wherein the surface for glueing a glueable fitting, coupling, or pipe to the pipe joint is formed on the exterior of the ferrule.

5. A plastic pipe joint assembly for joining a terminal end of a non-glueable plastic pipe to glueable pipes, couplings and fittings comprising:

a metal insert and a plastic ferrule, said metal insert having a cylindrical shape for insertion into said plastic pipe, a shoulder for disposition against the terminal end of the pipe, and barbed ribs on the surface of the metal insert for fixedly engaging the pipe on the pipe's interior;

said ferrule having a cylindrical shape for fitting around the pipe, and further having an inner diameter sufficiently larger than the pipe's outer diameter to permit the terminal end of the pipe to be inserted into the ferrule, said terminal end of the pipe having the insert inside the end of the pipe when said pipe end is placed inside the ferrule, said ferrule also comprising means for fixedly engaging the pipe on a portion of the ferrule's inner surface for engaging the pipe on the pipe's exterior, wherein a portion of the ferrule that does not engage the pipe provides a surface for glueing a glueable fitting, coupling, or pipe to the pipe joint;

said insert, after expansion within the pipe, being fixedly engaged in the pipe by the barbed ribs on the insert penetrating the pipe on the pipe's interior, said ferrule, after the expansion of the insert in the pipe, being fixedly engaged on the pipe by the ferrule's engaging means penetrating the pipe on the pipe's exterior, said pipe being fixed in place between the expanded insert and the ferrule by compression of the pipe between the outer surface of the insert against the inner surface of the ferrule.

6. The pipe joint of claim 5, wherein, after expansion of the insert in the pipe, the shoulder on the insert is imbedded into the inner surface of the ferrule for fixing the position of the insert in the ferrule and providing a seal against leakage from the pipe joint.

7. The plastic pipe joint of claim 5, wherein a portion of the interior surface of the ferrule that does not engage the pipe provides the surface for glueing a glueable fitting, coupling, or pipe to the pipe joint.

8. The plastic pipe joint of claim 5, wherein the surface for glueing a glueable fitting, coupling, or pipe to the pipe joint is formed on the exterior of the ferrule.

9. A plastic pipe joint assembly for joining a terminal end of a non-glueable plastic pipe to glueable pipes, couplings and fittings comprising:

a metal insert and a plastic ferrule, said metal insert having a cylindrical shape for insertion into said plastic pipe, a shoulder for disposition against the terminal end of the pipe, and means for fixedly engaging the pipe on the surface of the metal insert for engaging the pipe on the pipe's interior;

said ferrule having a cylindrical shape for fitting around the pipe, and further having an inner diameter sufficiently larger than the pipe's outer diameter to permit the terminal end of the pipe to be inserted into the ferrule, said terminal end of the pipe having the insert inside the end of the pipe when said pipe end is placed inside the ferrule, said ferrule also comprising barbed ribs on a portion of the ferrule's inner surface for fixedly engaging the pipe on its exterior, wherein a portion of the ferrule that does not engage the pipe provides a surface for glueing a glueable fitting, coupling, or pipe to the pipe joint;

said insert, after expansion within the pipe, being fixedly engaged in the pipe by the insert's engaging means penetrating the pipe on the pipe's interior, said ferrule, after the expansion of the insert in the pipe, being fixedly engaged on the pipe by the ferrule's barbed ribs penetrating the pipe on the pipe's exterior, said pipe being fixed in place between the expanded insert and the ferrule by compression of the pipe between the outer surface of the insert against the inner surface of the ferrule.

10. The pipe joint of claim 9, wherein, after expansion of the insert in the pipe, the shoulder on the insert is imbedded into the inner surface of the ferrule for fixing the position of the insert in the ferrule and providing a seal against leakage from the pipe joint.

11. The plastic pipe joint of claim 9, wherein a portion of the interior surface of the ferrule that does not engage the pipe provides the surface for glueing a glueable fitting, coupling, or pipe to the pipe joint.

12. The plastic pipe joint of claim 9, wherein the surface for glueing a glueable fitting, coupling, or pipe to the pipe joint is formed on the exterior of the ferrule.

13. A plastic pipe joint assembly for joining a terminal end of a non-glueable plastic pipe to glueable pipes, couplings and fittings comprising:

a metal insert and a plastic ferrule, said metal insert having a cylindrical shape for insertion into said plastic pipe, a shoulder for disposition against the terminal end of the pipe, and barbed ribs on the surface of the metal insert for fixedly engaging the pipe on the surface of the metal insert on the pipe's interior;

said ferrule having a cylindrical shape for fitting around the pipe, and further having an inner diameter sufficiently larger than the pipe's outer diameter to permit the terminal end of the pipe to be inserted into the ferrule, said terminal end of the pipe having the insert inside the end of the pipe when said pipe end is placed inside the ferrule, said ferrule also comprising barbed ribs on a portion of the ferrule's inner surface for fixedly engaging the pipe on its exterior, wherein a portion of the ferrule that does not engage the pipe provides a surface for glueing a glueable fitting, coupling, or pipe to the pipe joint;

said insert, after expansion within the pipe, being fixedly engaged in the pipe by the insert's barbed ribs penetrating the pipe on the pipe's interior, said ferrule, after the expansion of the insert in the pipe, being fixedly engaged on the pipe by the ferrule's barbed ribs penetrating the pipe on the pipe's exterior, said pipe being fixed in place between the expanded insert and the ferrule by compression of the pipe between the outer surface of the insert against the inner surface of the ferrule.

14. The pipe joint of claim 13, wherein, after expansion of the insert in the pipe, the shoulder on the insert is imbedded into the inner surface of the ferrule for fixing the position of the insert in the ferrule and providing a seal against leakage from the pipe joint.

15. The plastic pipe joint of claim 13, wherein a portion of the interior surface of the ferrule that does not engage the pipe provides the surface for glueing a glueable fitting, coupling, or pipe to the pipe joint.

16. The plastic pipe joint of claim 13, wherein the surface for glueing a glueable fitting, coupling, or pipe to the pipe joint is formed on the exterior of the ferrule.

* * * * *